United States Patent
Lightstone et al.

(10) Patent No.: US 9,485,677 B2
(45) Date of Patent: Nov. 1, 2016

(54) DETERMINING HEARABILITY IN A HETEROGENOUS COMMUNICATION NETWORK

(71) Applicant: Telefonaktiebolaget LM Ericsson (Publ), Stockholm (SE)

(72) Inventors: Leonard Lightstone, Ottawa (CA); Christian Skärby, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 487 days.

(21) Appl. No.: 13/736,678

(22) Filed: Jan. 8, 2013

(65) Prior Publication Data
US 2014/0086062 A1    Mar. 27, 2014

Related U.S. Application Data

(60) Provisional application No. 61/705,341, filed on Sep. 25, 2012.

(51) Int. Cl.
H04W 24/06    (2009.01)
H04L 1/18    (2006.01)
(Continued)

(52) U.S. Cl.
CPC ............ *H04W 24/06* (2013.01); *H04L 1/1812* (2013.01); *H04L 1/24* (2013.01); *H04W 24/10* (2013.01); *H04W 72/1231* (2013.01); *H04W 88/085* (2013.01)

(58) Field of Classification Search
None
See application file for complete search history.

(56) References Cited

U.S. PATENT DOCUMENTS

2009/0040985 A1*  2/2009  Barnawi et al. ............... 370/336
2010/0157955 A1*  6/2010  Liu et al. ...................... 370/336
(Continued)

FOREIGN PATENT DOCUMENTS

EP    2 451 111 A1    5/2012
WO   2009057932 A2    5/2009
(Continued)

OTHER PUBLICATIONS

3GPP TSG-RAN WG1 #64 R1-110649; Taipei, Taiwan, Feb. 21-Feb. 25, 2011, Source: Ericsson, ST-Ericsson Title: "Aspects on Distributed RRUs with Shared Cell-ID for Heterogeneous Deployments" Agenda Item: 6.3.12 Document for: Discussion and Decision consisting of 11-pages.
(Continued)

*Primary Examiner* — Dang Ton
*Assistant Examiner* — Ronald H Davis
(74) *Attorney, Agent, or Firm* — Christopher & Weisberg, P.A.

(57) ABSTRACT

A method for determining whether a radio unit in a shared cell configuration is hearable by a user equipment is provided. Transmission of a probe message to the user equipment by the radio unit is caused. The probe message invokes a probe response from the user equipment if the radio unit is hearable by the user equipment on a downlink channel. The radio unit is hearable by the user equipment if the downlink channel performance between the radio unit and the user equipment meets a predetermined signal criteria. An uplink channel associated with the user equipment is monitored for the probe response from the user equipment after transmission of the probe message. Hearability data associated with the user equipment is determined based on the monitored uplink channel. The hearability data indicates whether the radio unit is hearable by the user equipment the downlink channel.

21 Claims, 7 Drawing Sheets

(51) Int. Cl.
*H04W 24/10* (2009.01)
*H04W 72/12* (2009.01)
*H04W 88/08* (2009.01)
*H04L 1/24* (2006.01)

(56) References Cited

U.S. PATENT DOCUMENTS

| | | | |
|---|---|---|---|
| 2010/0167743 A1* | 7/2010 | Palanki et al. | 455/436 |
| 2010/0238854 A1* | 9/2010 | Kazmi et al. | 370/315 |
| 2012/0026941 A1* | 2/2012 | Ahmad et al. | 370/328 |
| 2012/0106349 A1* | 5/2012 | Adjakple et al. | 370/241 |
| 2012/0315841 A1* | 12/2012 | Zhou et al. | 455/11.1 |
| 2013/0308469 A1* | 11/2013 | Lightstone et al. | 370/252 |

FOREIGN PATENT DOCUMENTS

| | | |
|---|---|---|
| WO | 2011019571 A1 | 2/2011 |
| WO | 2011112127 A1 | 9/2011 |

OTHER PUBLICATIONS

PCT Invitation to Pay Additional Fees, Form PCT/ISA/206, dated Apr. 23, 2014 for corresponding International Application No. PCT/IB2013/058174; International Filing Date: Aug. 30, 2013 consisting of 5-pages.

International Search Report and Written Opinion, Form PCT/ISA/220, dated Jun. 12, 2014 for corresponding International Application No. PCT/IB2013/058174; International Filing Date: Aug. 30, 2013 consisting of 17-pages.

* cited by examiner

DETERMINING HEARABILITY IN A HETEROGENOUS COMMUNICATION NETWORK

This application is related to and claims priority to U.S. Provisional Application Ser. No. 61/705,341, filed Sep. 25, 2012, entitled METHOD TO IDENTIFY OPPORTUNITIES FOR DL IMPROVEMENTS IN SHARED CELLS, the entirety of which is incorporated herein by reference.

TECHNICAL FIELD

The present invention relates to wireless communication networks, and in particular to determining hearability in wireless communication networks.

BACKGROUND

The constantly increasing demand for high data rates in wireless communication networks continues to put pressure on service operators to evolve their existing wireless networks. Several approaches have been implemented to provide higher data rates. One approach is to increase the density of macro base stations in the network and to increase the cooperation between macro base stations. While increasing macro base station density and cooperation provides increased data rates, the added cost and delay associated with adding macro base stations often makes this option undesirable.

Another approach involves deploying smaller base stations within an already existing macro layer grid, i.e., building a heterogeneous network. Smaller base stations are more cost-efficient than macro base stations and can typically be deployed in a short time span. The macro layer is able to service users moving at high speed, as well as service wider areas where the demand for high data rates is less, while the smaller base stations are able to provide increased functionality. For example, the use of smaller base stations in the macro layer grid allows service operators to customize deployment of smaller base stations to service areas having higher density of users that require higher data rates, i.e., hotspots. However, the dense deployment of macro base stations and smaller base stations causes the problem of increased signaling complexity due to frequent handovers of users moving at high speeds.

One instantiation of a heterogeneous network that decreases signaling complexity is a shared cell heterogeneous deployment. In a shared cell, the macro base station and smaller base stations within macro coverage area share the same cellular identification (ID) such that, from a mobile user equipment (UE) perspective, the macro and smaller base stations appear as one cell. In particular, with respect to long term evolution (LTE) networks, a central evolved node B ("CeNodeB") is connected to a main, i.e., high power, radio that defines the macrocell. The CeNodeB is also connected to lower power radio units ("RUs") or reception/transmission ("R/T") point. Each R/T point will typically have at least two antennas such as a main antenna and a diversity antenna and also shares the same cell ID used by the CeNodeB. The shared cell approach avoids the proliferation of cell IDs and does not require multiple carriers.

However, in a shared cell, the radio propagation conditions are such that in many instances a UE will not be able to hear the downlink signal from one or more R/T points. While this situation presents the potential for either spectral reuse within the shared cell, or power saving and interference reduction within the shared cell, the CeNodeB is required to determine which UE-R/T point pairs have a viable communication channel, i.e., are hearable in both uplink and downlink directions. In a shared cell heterogeneous network, the CeNodeB can distinguish the R/T point using uplink signals from each R/T point on the common public radio interface ("CPRI") line on which the UE uplink signals appear, as discussed above. This allows uplink hearability for any UE-R/T point combination to be determined by assessing the uplink signal specific to the pair in question. In time division duplex ("TDD") systems, due to the uplink and downlink reciprocity, the uplink hearability assessment also indicates downlink hearability. However, for frequency division duplex ("FDD") systems, the uplink hearability does not indicate downlink hearability status.

SUMMARY

The present invention advantageously provides a device and method for determining user equipment hearability.

According to one embodiment, a device for determining whether a radio unit in a shared cell configuration is hearable by user equipment is provided. The device includes a processor configured to cause transmission of a probe message to the user equipment by the radio unit. The probe message invokes a probe response from the user equipment if the radio unit is hearable by the user equipment on a downlink channel. The radio unit is hearable by the user equipment if the downlink channel performance between the radio unit and the user equipment meets a predetermined signal criteria. The processor is further configured to monitor an uplink channel associated with the user equipment for the probe response from the user equipment after transmission of the probe message. The processor is further configured to determine hearability data associated with the user equipment based on the monitored uplink channel. The hearability data indicates whether the radio unit is hearable by the user equipment on the downlink channel.

In accordance with one embodiment of this aspect of the invention, the probe message includes a false downlink assignment configured to cause the user equipment to monitor a downlink channel associated with the false downlink assignment for false test data if the radio unit is hearable by the user equipment on the downlink channel.

In accordance with one embodiment of this aspect of the invention, the probe message includes a downlink assignment associated with downlink shared channel data. The probe message causes the user equipment to enter a hybrid automatic repeat request, HARQ, state if the radio unit is hearable by the user equipment on a downlink channel.

In accordance with one embodiment of this aspect of the invention, the hearability data indicates the radio unit is hearable by the user equipment if the received probe response is a hybrid automatic repeat request, HARQ, negative acknowledgement, NACK, message.

In accordance with one embodiment of this aspect of the invention, the hearability data indicates the radio unit is hearable by the user equipment if the received probe response is a hybrid automatic repeat request, HARQ, negative acknowledgement, NACK, message.

In accordance with one embodiment of this aspect of the invention, the hearability data indicates the radio unit is unhearable by the user equipment if no probe response is received.

In accordance with one embodiment of this aspect of the invention, the probe message causes the user equipment to enter a HARQ state if the radio unit is hearable by the user equipment. The processor is further configured to cause transmission of a clean-up message to the user equipment in response to the received HARQ NACK message. The clean-up message causing the user equipment to exit the HARQ state.

In accordance with one embodiment of this aspect of the invention, the processor further causes another probe message to be transmitted to the user equipment if a received probe response is a hybrid automatic repeat request, HARQ, acknowledgement, ACK, message. The reception of the HARQ ACK message indicates an error occurred in determining user equipment hearability.

In accordance with one embodiment of this aspect of the invention, the user equipment to which the probe message is transmitted is selected, by the processor, from a list of a plurality of user equipments. The plurality of user equipments included in the list are unhearable by the radio unit on an uplink channel.

In accordance with one embodiment of this aspect of the invention, the processor is further configured to cause another probe message to be transmitted to another user equipment included in the list of the plurality of user equipments before hearability data is determined.

According to another embodiment, a radio unit in a shared cell configuration is provided. The radio unit includes a transmitter configured to transmit a probe message. The radio unit further includes a processor configured to cause the transmission of the probe message. The probe message invokes a response from a user equipment if the radio unit is hearable by the user equipment on a downlink channel. The radio unit is hearable by the user equipment if the downlink channel performance between the radio unit and the user equipment meets a predetermined signal criteria.

In accordance with one embodiment of this aspect of the invention, the probe message includes a false downlink assignment configured to cause the user equipment to monitor a downlink channel associated with the false downlink assignment for false test data if the radio unit is hearable by the user equipment on the downlink channel.

According to another embodiment, a method for determining whether a radio unit in a shared cell configuration is hearable by a user equipment is provided. Transmission of a probe message to the user equipment by the radio unit is caused. The probe message invokes a probe response from the user equipment if the radio unit is hearable by the user equipment on a downlink channel. The radio unit is hearable by the user equipment if the downlink channel performance between the radio unit and the user equipment meets a predetermined signal criteria. An uplink channel associated with the user equipment is monitored for the probe response from the user equipment after transmission of the probe message. Hearability data associated with the user equipment is determined based on the monitored uplink channel. The hearability data indicates whether the radio unit is hearable by the user equipment the downlink channel.

In accordance with one embodiment of this aspect of the invention, the probe message includes a false downlink assignment configured to cause the user equipment to monitor a downlink channel associated with the false downlink assignment for false test data if the radio unit is hearable by the user equipment.

In accordance with one embodiment of this aspect of the invention, the probe message includes a downlink assignment associated with downlink shared channel data. The probe message causes the user equipment to enter a hybrid automatic repeat request, HARQ, state if the radio unit is hearable by the user equipment on a downlink channel.

In accordance with one embodiment of this aspect of the invention, the hearability data indicates the radio unit is hearable by the user equipment if the received probe response is a hybrid automatic repeat request, HARQ, negative acknowledgement, NACK, message.

In accordance with one embodiment of this aspect of the invention, the hearability data indicates the radio unit is unhearable by the user equipment if no probe response is received.

In accordance with one embodiment of this aspect of the invention, transmission of a clean-up message to the user equipment is caused in response to the received HARQ NACK message. The clean-up message causes the user equipment to exit a HARQ state.

In accordance with one embodiment of this aspect of the invention, another probe message is caused to be transmitted to the user equipment if the received probe message is a HARQ acknowledgement, ACK, message. The reception of the ACK message indicates an error occurred in determining user equipment hearability.

In accordance with one embodiment of this aspect of the invention, at least one of frequency reuse and elimination of at least one downlink transmission is implemented based at least in part on the determined hearability data.

According to another embodiment, a method for determining downlink hearability of a plurality of radio units by user equipments in a shared cell heterogeneous deployment is provided. A radio unit is selected from the plurality of radio units. A list of user equipments that are uplink unhearable by the selected radio unit is generated. A first user equipment is selected from the list. A determination whether downlink hearability of the first user equipment has been previously determined within a predefined time period is made. A determination whether a downlink channel has available resources to transmit a probe message to the first user equipment is made if downlink hearability of the first user equipment has not been previously determined within the predefined time period. The probe message is transmitted to the first user equipment if the determination is made that downlink channel resources are available. The probe message is arranged to invoke a probe response from the first user equipment if the selected radio unit is hearable by the first user equipment on the downlink channel.

In accordance with one embodiment of this aspect of the invention, the probe message includes a false downlink assignment configured to cause the first user equipment to monitor a downlink channel associated with the false downlink assignment for false test data if the selected radio unit is hearable by the first user equipment on the downlink channel.

In accordance with one embodiment of this aspect of the invention, a second user equipment is selected from the list of user equipments that are not uplink hearable by the selected radio unit. A determination whether downlink hearability of the second user equipment has been previously determined within a predefined time period is made. A determination whether the downlink channel has available resources to transmit a second probe message to the second user equipment is made if hearability of the second user equipment has not been previously determined within the predefined time period. The second probe message is transmitted to the second user equipment if the determination is made that downlink channel resources are available. The second probe message is arranged to invoke a probe response from the second user equipment if the selected radio unit is hearable by the second user equipment on the downlink channel.

In accordance with one embodiment of this aspect of the invention, a second radio unit is selected from the plurality of radio units. A list of user equipments that are uplink unhearable by the second radio unit is generated. A third user equipment is selected from the list associated with second radio unit. A determination whether the downlink channel has available resources to transmit a third probe message to the third user equipment is made. The third probe message is transmitted to the third user equipment if the determination is made that downlink channel resources are available. The third probe message is arranged to invoke a probe response from the third user equipment if the second radio unit is hearable by the third user equipment on the downlink channel.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
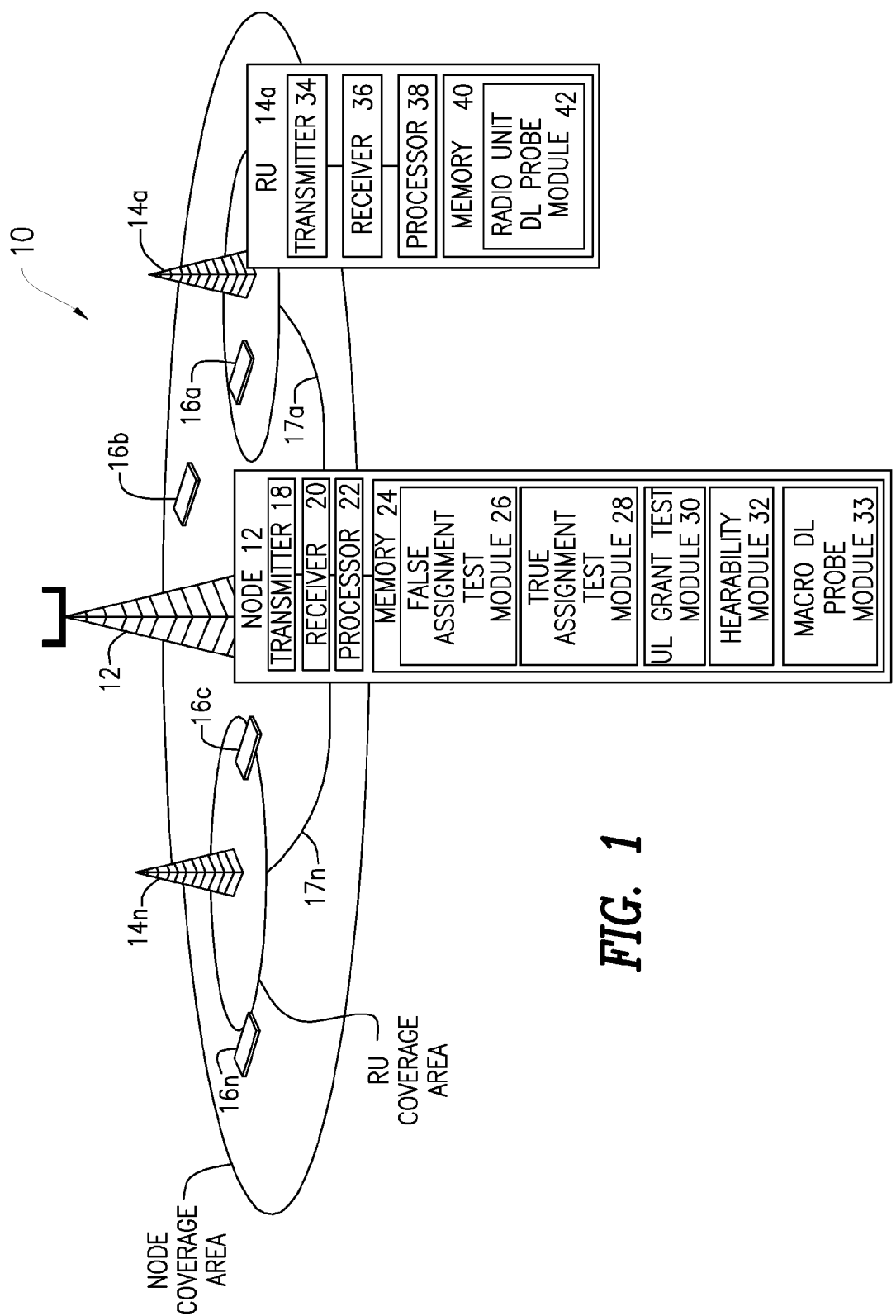
FIG. 1 is a diagram of an exemplary communication system having downlink probe support constructed in accordance with the principles of the present invention.

The present invention advantageously provides a device and method for determining downlink user equipment hearability. Accordingly, components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description.

Referring now to drawing figures in which like reference designators refer to like elements there is shown in FIG. 1 an exemplary communication system having a downlink hearability probe constructed in accordance with the principles of the present invention and designated generally as "10." System 10 in a shared cell heterogeneous deployment.

System 10 includes node 12, one or more radio units 14a to 14n (collectively referred to as "radio unit 14" or "RU 14"), one or more user equipments 16a to 16n (collectively referred to as "user equipment 16" or "UE 16") and one or more common public radio interface lines 17a to 17n (collective referred to as "common public radio interface line 17" or "CPRI line 17").

Node 12 is a receive/transmit point or base station such as an LTE central evolved node B (CeNodeB) having a cellular identifier, cell ID, in which node 12 forms a macrocell or shared cell coverage region or area. Node 12 includes one or more transmitters 18 and one or more receivers 20 for communicating with RU 14 and/or UE 16 using communication protocols known in the art such as Internet Protocols along with Long Term Evolution (LTE) standards. Node 12 further includes one or more processors 22 in communication with transmitter 18 and receiver 20. Processor 22 may be one or more central processing units (CPUs) for performing node 12 functions described herein.

Node 12 further includes memory 24 in communication with processor 22. Memory 24 may include non-volatile and volatile memory. For example, non-volatile memory may include a hard drive, flash memory, memory stick and the like. Also, volatile memory may include random access memory and others known in the art. Memory 24 may store program instructions such as those for false assignment test module 26, true assignment test module 28, uplink (UL) grant test module 30, hearability module 32 and macro downlink (DL) probe module 33, among other modules. In particular, hearability module 32 includes instructions, which when executed by processor 22, causes processor 22 to perform the hearability process, discussed in detail with respect to FIG. 2. False assignment test module 26 includes instructions, which when executed by processor 22, causes processor 22 to perform the false assignment test process, discussed in detail with respect to FIG. 3. True assignment test module 28 includes instructions, which when executed by processor 22, causes processor 22 to perform the true assignment test process, discussed in detail with respect to FIG. 4. Uplink grant test module 30 includes instructions, which when executed by processor 22, causes processor 22 to perform the uplink grant test process, discussed in detail with respect to FIG. 5. While node 12 is illustrated having various test modules, one or more test modules may be omitted from memory 24 based on design need such that node 12 performs one or more types of test processes. Downlink (DL) probe module 33 includes instructions, which when executed by processor 22, causes processor to perform the DL probe process, discussed in detail with respect to FIG. 6.

RU 14 is a reception/transmission (R/T) point having the same cell ID as node 12 in which RU 14 forms an RU coverage region or area, i.e., RU 14 is in a shared cell configuration. RU 14 includes one or more transmitters 34 and one or more receivers 36 arranged to communicate with node 12 and/or UE 16. For example, RU 14 communicates with node 12 via CPRI line 17 and with UEs 16 located within and/or proximate RU coverage area using communication protocols known in the art. RU 14 and/or node 12 communicate with UE 16 on one or more downlink (DL) channels and/or different DL paths, for example, LTE standard, e.g., physical downlink control channel (PDCCH) among other downlink channels known in the art. For example, node 12 causes RU 14 to transmit a probe packet on the PDCCH to UE 16 such the UE 16 downlink hearability may be determined, as discussed in detail with respect to FIGS. 3-8. Each RU 14 within a macrocell or node 12 coverage area may have the same number of antennas and identical cell specific reference signal (RS).

RU 14 include includes one or more processors 38 in communication with transmitter 34 and receiver 36. Processor 38 is configured to perform RU 14 functions described herein. RU 14 includes memory 40 in communication with processor 38 that generally corresponds to memory 24. Memory 40 may store program instructions such as those for radio unit DL probe module 42, among other modules. In particular, radio unit DL probe module 42 includes instructions, which when executed by processor 38, causes processors 38 to perform the radio unit DL probe process, discussed in detail with respect to FIG. 7. For example, RU 14 may construct the DL frame, including the test probe message, locally for transmission to RU 16. Alternatively, RU 14 may receive the complete DL frame for transmission, including the test probe message, from node 12 via CPRI line 17 for transmission to UE 16.

UE 16 may include a transmitter, receiver, processor and memory (not shown) in communication with each other that generally correspond to the components of node 12 and/or RU 14, with size and performance being adjusted based on design needs, while providing UE 16 functionality as is well known in the art. UE 16 communicates with RU 14 and/or node 12 using communication protocols known in the art, e.g., using Internet Protocols along with LTE standards. In particular, UE 16 may communicate with RU 14 and/or node 12 over one or more uplink (UL) channels and/or different UL paths, for example, LTE standard, e.g., uplink shared channel (ULSCH) among other uplink channels known in the art. For example, node 12 may monitor the ULSCH for signaling associated with UE 16 in response to transmitting an UL grant to UE 16, as discussed in detail with respect to FIG. 5.

Figure 2:
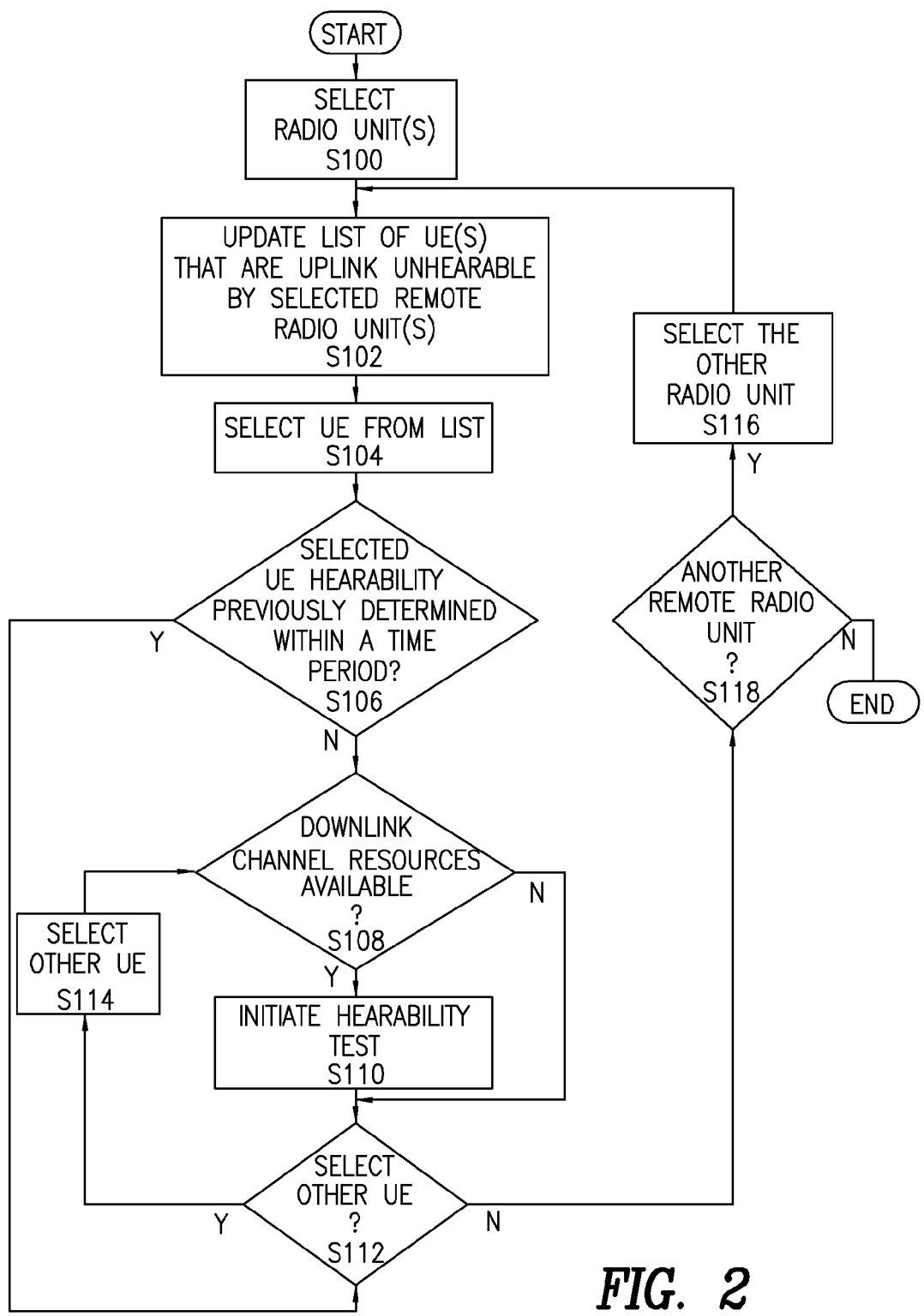
FIG. 2 is a flow chart of an exemplary hearability process for determining downlink hearability of user equipments with in a macrocell constructed in accordance with the principles of the present invention.

An exemplary hearability process for determining downlink hearability of UEs 16 within a macrocell is described with reference to FIG. 2. If UE 16 receives a negligible signal from RU 14, UE 16 is DL radio isolated/unhearable by RU 14, i.e., the received signal from RU 14 fails to meet a predetermined signal criteria. UE 16 is hearable or not DL radio isolated by selected RU 14 if the received signal from RU 14 meets the predetermined signal criteria. The DL hearability process updates and examines the list of UEs 16 every transmission time interval (TTI), e.g., every 1 millisecond, to determine which UEs 16 should be evaluated for DL hearability. UEs 16 included in the list of UEs 16 are UEs 16 that receive a DL signal from at least one RU 14 within the macrocell such that the connection to the network is being maintained. Processor 22 selects RU 14 (Block S100). In particular, at TTI n (n=0, 1, 2, 3 . . . ), processor 22 begins the DL hearability process by selecting the RU 14. A list of RUs 14 serviced by node 12 is known a priori by node 12. In an alternative embodiment, multiple RUs 14 may be selected at a time such that the multiple RUs 14 substantially simultaneously transmit the probe message to a particular UE 16, i.e., UE 16 selected in Block S104 discussed below. An individual RU 14 may be selected in a subsequent TTI if the multiple RUs 14 test fails, i.e., UE 16 is determined to be hearable at one or more of the multiple RUs 14.

Processor 22 updates the list of UEs 16 that are UL unhearable or not hearable by the selected RU 14 (Block S102). For example, processor 22 keeps a list of UEs 16 stored in memory 24 that are determined to be UL unhearable at selected RU 14 based at least in part on UL hearability status associated with UE 16, results from previous DL probes and/or mobility updates, among other received data associated UL hearability. For example, UL signals received at each RU 14 may be examined by node 12 for shared channel, control channel and random access channel (RACH) UL signals from each UE 16 such that UL hearability of each UE-RU pair can be assessed. Mobility updates may include updates to add or remove UE 16 to/from list of UEs 16 based on presence in macrocell coverage area of node 12 and/or remove UE 16 from list of UEs 16 if UE 16 is determined to have high mobility, i.e., only UEs 16 of low mobility are considered for the DL hearability process in order to avoid a situation that requires the frequent re-execution of the DL hearability process for the same UE 16. High UE mobility generally refers to a situation when UE 16 is determined to be moving faster than a first predetermined velocity and low UE mobility refers to a situation when UE 16 is determined to be moving slower than a second predetermined velocity or the first predetermined velocity. Alternatively, high mobility UEs 16 may be considered for the DL hearability process. As such, UEs 16 on the list of UEs 16, i.e., UE-RU pairs, have a high probability that the UEs 16 are DL unhearable.

Processor 22 selects UE 16 from the list of UEs 16 (Block S104). For example, processor 22 may start at the top of list of UEs 16 or other UE selection methods may be incorporated based on design need. Alternatively, UE 16 may be selected based at least in part on priority criteria. The priority criteria may include one or more rules for ranking UEs 16 in which a higher ranked UE 16 is selected before a lower ranked UE 16. For example, UEs 16 associated with larger data usage may be given priority over the other UEs 16 associated with smaller data usage.

Processor 22 determines whether DL hearability for selected UE 16 has been previously determined within a predetermined time period (Block S106). For example, the predetermined time may be m*TTI, where m is a positive integer greater than or equal to four, such that enough time is given for the DL probe to be initiated, results processed and the list of UEs 16 updated before re-testing the same UE 16. UE 16 being tested for DL hearability may be tagged or marked in list of UEs 16 stored in memory 24 such that processor 22 is able to determine UE 16 is undergoing the DL hearability process, i.e., marked "probe-in-progress." The tag or mark associated with UE 16 undergoing the DL hearability process is removed after the results of the DL hearability process or test is known such that the list of UEs 16 is updated accordingly. The DL hearability process may be designed such that each UE in the list of UEs 16 has DL hearability assessed periodically at intervals of T seconds, with a window of latitude of delta-T for each test, where T is a nonnegative integer.

If the determination is made that UE 16 hearability has not been previously determined within the predetermined time period, processor 22 considers the potential UE 16 and determines whether DL resources are available to transmit probe message to selected UE 16 (Block S108). For example, processor 22 determines whether PDCCH resources can be made available to transmit the probe message to UE 16. Since PDCCH is present in every subframe in communication standards such as LTE, using PDCCH to transmit the probe message provides plenty opportunities to perform the DL hearability process. For example, the test can be performed if the PDCCH channel is not heavily loaded for selected RUs 14. Moreover, because the DL hearability process does not need to be performed with strict periodicity, processor 22 may perform the test within a predefined time period around the desired test time.

If the determination is made that no DL resources are available, processor 22 determines whether to select another UE 16 (Block S112). If processor 22 determines DL resources are available, processor 22 initiates the DL hearability test, i.e., probe message is transmitted as discussed in detail with respect to FIGS. 3-5 (Block S110). Since m*TTIs time is needed to determine hearability results and update the list of UE 16, processor 22 continues to perform the test process discussed above with respect to FIGS. 3, 4 and 5 while continuing to Block S112, i.e., the selected UE 16 is marked "probe-in-progress" and processor 22 moves to Block 112. In particular, processor 22 determines whether to select another UE 16 (Block S112). For example, processor 22 determines whether there is another UE 16 on the list of UEs 16 that has not been selected or whether another UE 16 is not been evaluated within T minus delta-T.

If processor 22 makes the determination to select another UE 16, the other UE 16 is selected to undergo the test process (Block S114). The maximum number of UEs 16 considered for each RU 14 may be predefined or variable. For example, only a predetermined number of probe messages may be transmitted per TTI to avoid excessive PDCCH overhead in which the predetermined number of probes may be set based on design need. Alternatively, probe messages may be transmitted until PDCCH resources are exhausted, i.e., a variable number. As such, each TTI may have a set or variable number of probe messages that may be transmitted.

If processor 22 determines not to select another UE 16, processor 22 determines whether there is another RU 14 to consider (Block S116). If the remaining UEs 16 have been evaluated for DL hearability within T minus delta-T, then the remaining UEs 16 on the list are of no interest during the current TTI, i.e., processor determines not to select another UE 16. For example, processor 22 determines whether there is an unselected RU 14 on list of RUs 14, whether the bottom of the list of RUs 14 has been reached or whether the remaining UEs 16 in list of UEs 16 have been evaluated within T minus delta-T. If the determination is made not to consider another RU 14 the DL hearability process may end for the current hearability cycle. If processor 22 determines to consider another RU 14, processor 22 selects the other RU 14 and returns to Block S102 (Block S118).

Figure 3:
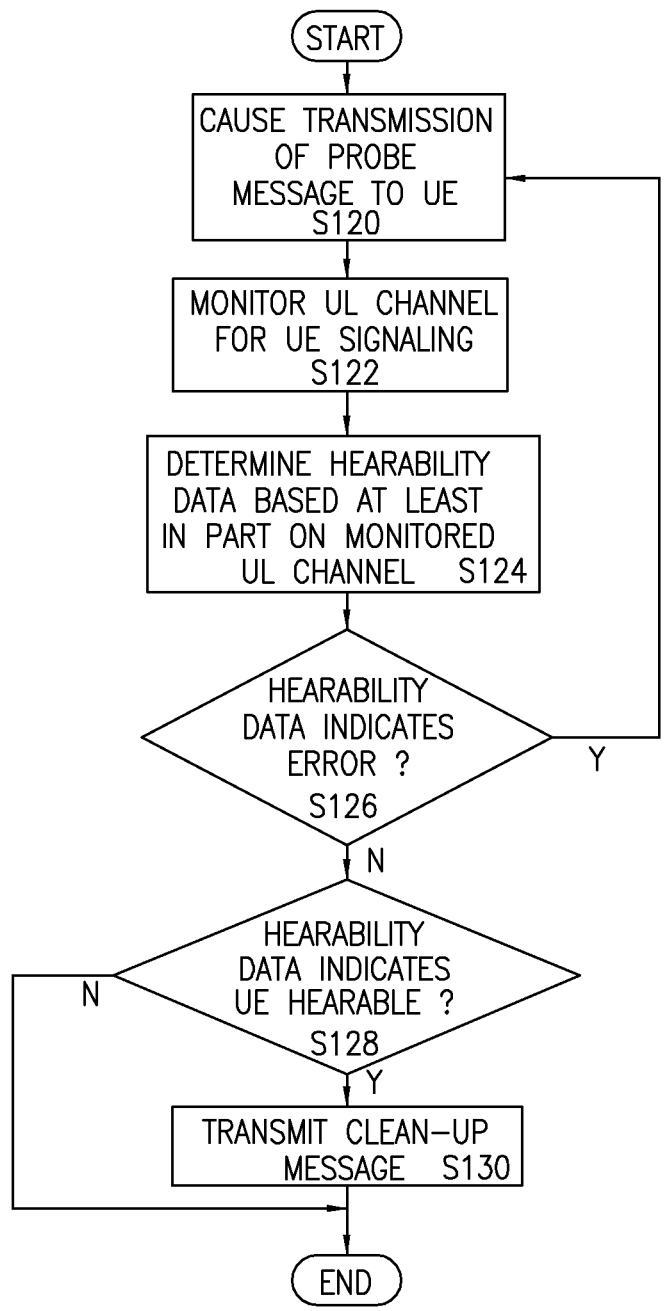
FIG. 3 is a flow chart of an exemplary false assignment test process for determining downlink hearability performed in accordance with the principles of the present invention.

An exemplary false assignment test process for determining DL hearability of UE 16 is described with reference to FIG. 3. Processor 22 causes at least one RU 14 to transmit probe message or packet to a selected UE 16 (Block S120). For example, a DL scheduler causes RU 14a to transmit the probe message to selected UE 16, i.e., to UE 16 being tested for DL hearability. In one embodiment, the probe message may include a "false" DL assignment configured to cause UE 16 to "listen" or monitor for DL data associated with the false downlink assignment that is never sent, i.e., DL data is false test data that corresponds to no actual data. In particular, no physical downlink shared channel (PDSCH) resources for UE 16 under investigation are transmitted. The false DL assignment causes UE 16 to monitor for DL data if the probe message is received by UE 16, i.e., UE 16 monitors for DL data if selected RU 14 that transmits the probe message is DL hearable by UE 16. For example, if UE 16 "hears" the false DL assignment, UE 16 will attempt to decode the indicated physical resource blocks (PRBs) associated with the DL assignment that will cause UE 16 to enter a hybrid automatic repeat request (HARD) process since no actual data is associated with the false DL assignment. The false DL assignment or PDCCH assignment used for the probe may have a downlink control information (DCI) format of 1A, as defined in LTE standards, such that the probe is made as small as possible, i.e., consumes minimal resources.

As discussed above, the false packet or DL data associated with the probe message may be a phantom data that was never transmitted, or data intended for a different UE, which causes UE 16 to enter a hybrid automatic repeat request, HARQ, state in which UE 16 may transmit a HARQ negative acknowledgement (NACK) message. In particular, if actual data associated with the probe message is not properly decoded by UE 16, UE 16 transmits HARQ NACK message on the physical uplink control channel (PUCCH), i.e., UE 16 enters the HARQ process or state based at least in part on the received probe message. In other words, UE 16 indicates an error occurred in reception of DL data associated with the false DL assignment, even though the DL data was sent, such that UE 16 request re-transmission of DL data.

Also, placement of the probe message in the control channel element (CCE) space of the PDCCH may be made in the common search space or UE specific search space which UE 16 monitors and attempt to decode. The number of CCEs used for the probe message can be determined using scaled signal to interference plus noise ratio (SINR) based on RUs 14 or the same approach used in PDCCH assignments for paging. Also, the number of CCEs is spread across the signal bandwidth, i.e., PDCCH probe is wideband, such that the probe is less susceptible to fading. The strength of the probe can be adjusted to be less or more conservative through modification of the CCE aggregation level. In one embodiment, the probe uses the same CCE aggregation level used for a paging assignment. In another embodiment, the CCE aggregation level is based on the modulation and coding scheme (MCS) of UEs that may reuse the frequency spectrum.

Processor 22 monitors the UL channel for UE signaling (Block S122). For example, processor 22 monitors the UL channel associated with UE 16 on CPRI line 17 such as a PUCCH for a HARQ NACK message, acknowledgement (ACK) message or discontinuous transmission (DTX) condition. In particular, processor 22 monitors CPRI line 17 that provides communication between node 12 and selected RU 14 for UE signaling. Node 12 is able to distinguish UE signaling received from one or more RUs 14 based on the CPRI line 17 on which the uplink UE signaling appears. Further, node 12 may receive UE signaling directly from UE 16 as node 12 includes an associated R/T point that provides the node coverage area. In other words, UE 16 signaling may be received at both selected and unselected RUs 14 but node 12 is able to distinguish UE signaling received at selected and unselected RUs 14 based on which CPRI line 17 UE 16 signaling was received.

Processor 22 determines hearability data based at least in part the monitored UL channel (Block S124). For example, processor 22 determines selected RU 14 is DL hearable by UE 16 if a HARQ NACK message is received, i.e., determined hearability data indicates UE 16 is hearable. In other words, UE 16 enters a HARQ state and transmits a HARQ NACK message on the monitored UL channel as HARQ feedback. Since one PUCCH resource is used by UE 16 to transmit HARQ feedback, the false assignment test process is radio resource efficient. Moreover, since the DL assignment CCEs to PUCCH mapping is fixed in third generation partnership project (3GPP), the one PUCCH resource would not have been used for any other UE.

In another example, processor 22 may determine selected RU 14 is DL unhearable or non-hearable by UE 16 if hearability data indicates the monitored UL channel is in a DTX condition or no probe response has been received from UE 16, i.e., hearability data indicates UE 16 is unhearable. In particular, UE 16 does not transmit on the monitored uplink channel, i.e., PUCCH, if the probe message is not successfully received, thereby creating the DTX condition and/or meaning a probe response will not be received from UE 16. In particular, probe message is configured to cause UE 16 to transmit a HARQ NACK message if received by UE 16, else UE 16 does not transmit on the monitored UL channel, i.e., DTX condition or no probe response transmitted by UE 16. Further, hearability data may indicate an error occurred if a HARQ ACK message associated with UE 16 is received. In other words, receiving a HARQ ACK message associated with UE 16 indicates UE 16 received actual or valid data on the downlink associated with probe message if UE 16 was not suppose to received actual/valid data.

Processor 22 determines whether hearability data indicates an error occurred (Block S126). For example, processor 22 determines whether a HARQ ACK message associated with UE 16 was received if a HARQ NACK message, DTX channel condition or no probe response was expected. If processor 22 determines hearability data indicates an error occurred, the determination of Block S120 is repeated, i.e., processor 22 causes another probe message to be transmitted to UE 16 by selected RU 14. Alternatively, if processor determines hearability data indicates an error, processor 22 may tag RU 14 as hearable by UE 16. If processor 22 determines an error has not occurred, processor 22 determines whether hearability data indicates UE 16 is hearable (Block S128). For example, UE 16 is determined to be DL hearable if hearability data indicates a HARQ NACK message associated with UE 16 is received on the monitored UL channel. In another example, UE 16 is determined to be DL unhearable if the monitored UL channel is in a DTX condition or no probe response has been received after transmission of probe message.

If processor 22 determines UE 16 is DL hearable, processor 22 causes a clean-up message to be transmitted (Block S130). In particular, determining UE 16 is DL hearable indicates UE 16 received the probe message and is in a HARQ process monitoring for a re-transmitted packet. Therefore, the clean-up message is configured to force UE 16 to clean up the false HARQ process UE 16 is in by scheduling a packet with valid data using the same HARQ process number and a "new data indicator bit" on the PDCCH to UE 16. If processor 22 determines UE 16 is DL unhearable, the false assignment test process may end, i.e., UE 16 should not be in a HARQ process since hearability data indicates UE 16 did not receive the probe message.

Processor 22 may tag or mark UE 16 in the list of UEs 16 as being hearable or unhearable based at least in part on the results of the DL hearability process in which a hearable UE 16 may be removed from the list. The time the DL hearability process or test is performed or initiated for UE 16 may also be indicated in the mark. If the DL hearability process or test resulted in hearability data indicating an error, the mark or tag of UE 16 remains unchanged, i.e., still hearable. Alternatively, UE 16, i.e., UE-RU pair, may have to undergo and pass several DL hearability tests in order to determine UE 16 as being hearable or unhearable. For example, UE 16 transmits a HARQ NACK message during subsequent and/or sequential DL hearability processes or tests.

Determining DL hearability of UE 16 provides information that may be used by node 12 to improve downlink throughput via spectrum resource reuse, resource conservation, power savings and/or interference reduction. For example, DL frequency reuse provides DL macro cell capacity improvements. Resource conservation provides the option to trade off-improve DL throughput with transmit power savings and also reduces DL interference with other cells. Resource conservation also allows for reduced transport to RUs 14, i.e., R/T points. In the special case where selected RU 14 is not DL hearable by any UE 16 within the macrocell, processor 22 may cause all transmission in selected RU 14 to be turned off. The turned off transmission may include cell-specific reference signals (CRS), system information (SI) messages, physical broadcast channel (PBCH) and shared channels (SCHs). If RU 14 undergoes the DL hearability process or test, the transmission may be turned on in the subframe when the probe is transmitted. Alternatively, transmission may be turned on a few subframes before transmitting the probe message such that UE 16 filters can converge. Turning off transmission saves additional energy in RUs 14 during low load periods. For example, RU 14 that is unhearable by UE 16 may not transmit anything to UE 16 and/or may transmit data using the same resources to another UE 16 that is determined to be hearable.

Figure 4:
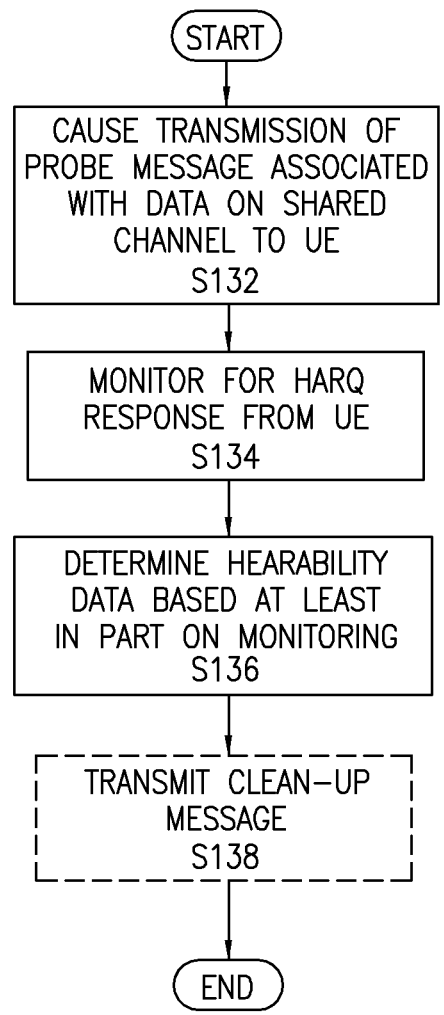
FIG. 4 is a flow chart of an alternative test process for determining downlink hearability performed in accordance with the principles of the present invention.

With respect to FIG. 4, an alternative test process, i.e., a true assignment test process, for determining downlink hearability of UEs 16 is described. Processor 22 causes RU 14 to transmit a probe message (Block S132). For example, processor 22 causes RU 14 to transmit a probe message associated with valid downlink shared channel (DLSCH) data that will cause UE 16 to enter a HARQ process. In other words, unlike the false assignment test process (FIG. 3) that transmits a probe message associated with "false" DL downlink data, the true assignment test process actually transmits a true DL assignment associated with DL data. Processor 22 monitors the UL channel for a HARQ response from UE 16, e.g., HARQ ACK/NACK message, DTX condition or no probe response (Block S134). Processor 22 determines hearability based at least in part on the monitored UL channel (Block S136). For example, processor 22 determines RU 14 is hearable by UE 16 if a HARQ response associated with UE 16 is received. In another example, processor 22 may determine RU 14 is unhearable by UE 16 if the monitored UL channel is in a DTX condition. Processor 22 may transmit a clean-up message if a HARQ response is received (Block S138). Alternatively, Block S138 may be skipped if a HARQ response associated with UE 16 is not received in response to the transmitted probe message, i.e., probe response not received by UE 16. The list of UEs 16, i.e., UE-RU pairs, may also be updated based on results of the DL hearability that were initiated m*TTI in the past. Any changes to the DL hearability state of the UEs 16 is communicated to the DL scheduler such that the UE can be treated accordingly.

Figure 5:
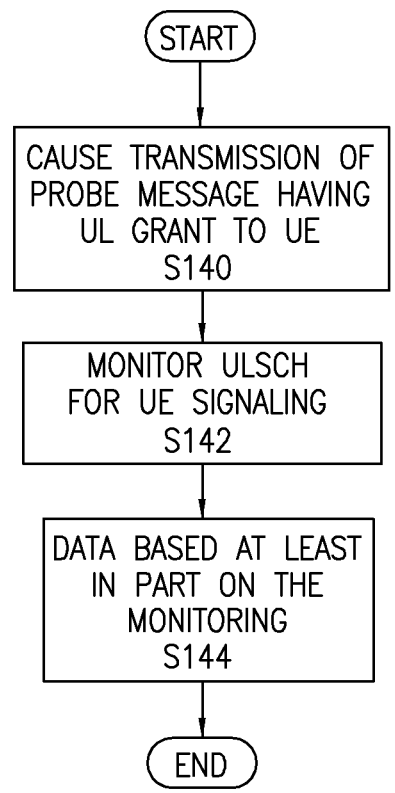
FIG. 5 is a flow chart of an another alternative test process for determining downlink hearability performed in accordance with the principles of the present invention.

Another alternative test process, i.e., uplink (UL) grant test process, for determining downlink hearability of UEs 16 is described with reference to FIG. 5. Processor 22 causes a probe message to be transmitted to UE 16 from RU 14 (Block S140). The probe message includes an UL grant to UE 16. Processor 22 monitors an UL channel for signaling associated from UE 16 associated with UL grant (Block S142). For example, processor 22 monitors the UL shared channel (ULSCH) for data associated from UE 16. Processor 22 determines hearability for UE 16 based at least in part on the monitored UL channel (Block S144). For example, if UL data associated with UE 16 is detected in response to the transmitted probe message, RU 14 is determined to be hearable by UE 16. A lack of UE data indicates RU 14 is unhearable by UE 16, i.e., UE 16 did not receive the UL grant because RU 14 is unhearable by UE 16.

Figure 6:
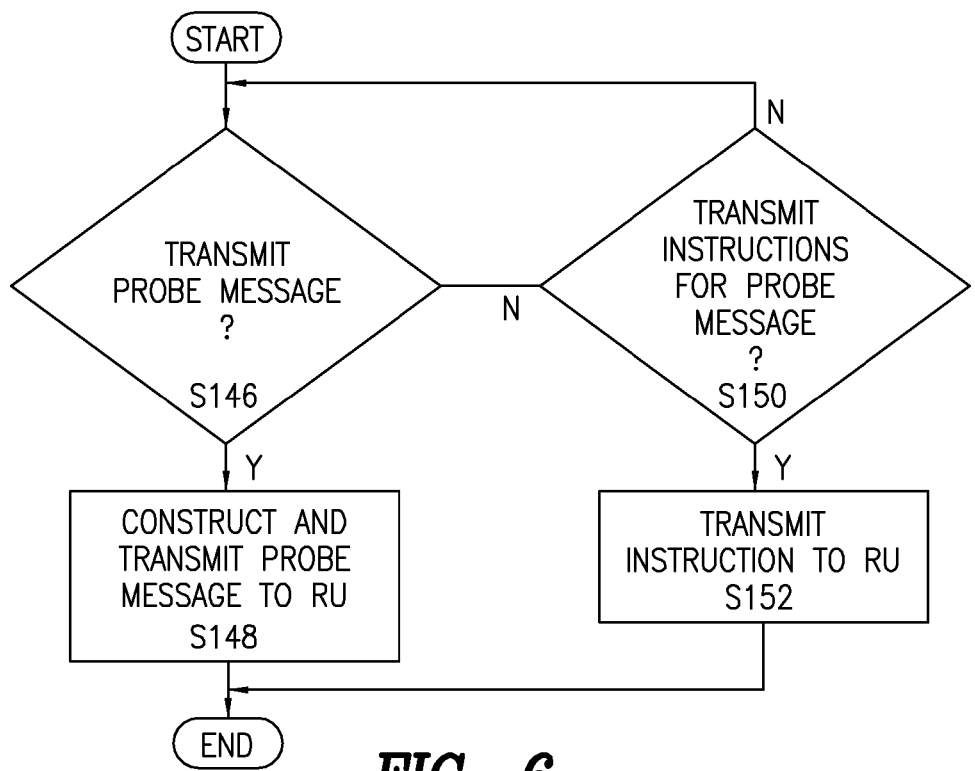
FIG. 6 is a flow chart of an exemplary macro downlink probe process performed in accordance with the principles of the present invention.

An exemplary macro downlink probe process for transmitting a probe message to UE 16 is described with reference to FIG. 6. Processor 22 determines whether to transmit a probe message for transmission to UE 16 via RU 14 (Block S146). For example, processor 22 may determine to construct a complete DL frame, including a probe message, for transmission to UE 16 via RU 14 in order to initiate the hearability test, as described in Block S110. If the determination is made to transmit a probe message, processor 22 constructs the probe message and causes transmitter 18 to transmit the probe message to RU 14 via CPRI line for transmission to UE 16 (Block S148). If the determination is made to transmit a probe message, but not construct the probe message at the macro node, processor 22 determines whether to transmit instructions to RU 14 to construct and transmit a probe message (Block S150). For example, RU 14 may be instructed to construct a complete DL frame, including probe message, locally for transmission to UE 16. If the determination is made to transmit instructions to RU 14, processor 22 causes transmitter 18 to transmit instructions to RU 14 such that RU 14 constructs and transmits the probe message (Block S152). The macro DL probe process may end or return to Block S146. If the determination is made not to transmit instructions to RU 14, the determination of Block S146 is repeated. One or more Blocks in FIG. 6 may be skipped or omitted based on design need. For example, Blocks S150 and S152 may be skipped or omitted if node 12 is designed to transmit the probe packet.

Figure 7:
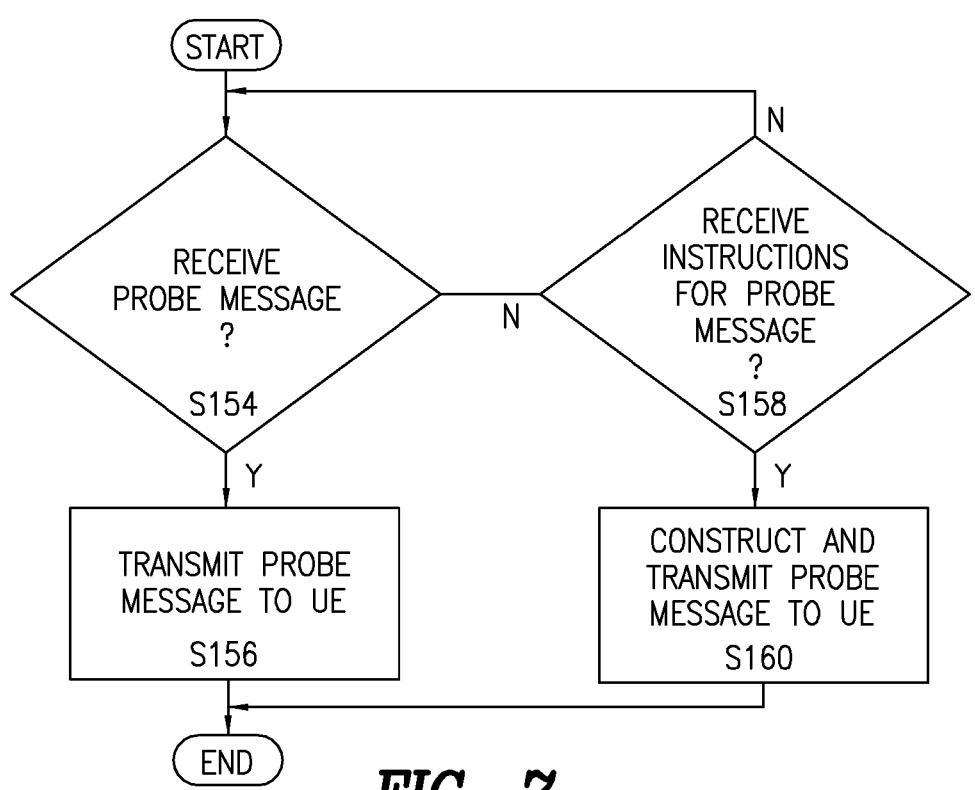
FIG. 7 is a flow chart of an exemplary radio unit downlink probes performed in accordance with the principles of the present invention.

An exemplary radio unit (DL) probe process for transmitting a probe message to UE 16 is described with reference to FIG. 7. Processor 38 determines whether a probe message has been received (Block S154). For example, processor 38 may determine a complete DL frame, including a probe message, has been received via CPRI line 17. If the determination is made that a probe message has been received, processor 38 causes transmitter 34 to transmit the probe message to UE 16 (Block S156). If the determination is made that a probe message has not been received, processor 38 determines whether instructions to construct and transmit a probe message have been received (Block S158). For example, receiver 36 receives instructions, via CPRI line 17, to construct the DL frame, including the probe message, locally for transmission to UE 16. If the determination is made that instructions have not been received, processor 38 performs the determination of Block S154 again. If the determination is made that instructions to construct and transmit the probe message have been received, processor 38 constructs the probe message and causes transmitter 34 to transmit the probe message to UE 16 (Block S160). The downlink probe process may end or may return to Block S154. One or more Blocks in FIG. 7 may be skipped or omitted based on design need. For example, Blocks S158 and S160 may be skipped or omitted if RU 14 is designed to receive the probe message from node 12.

Figure 8:
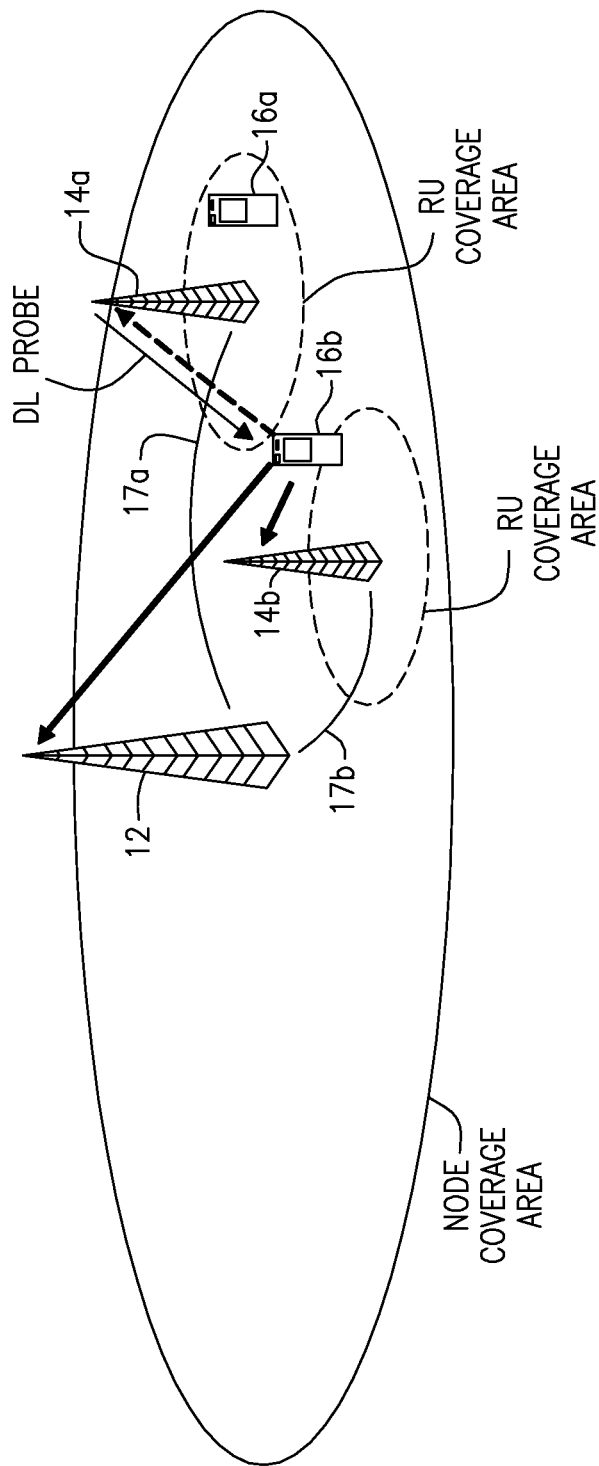
FIG. 8 is a diagram of an exemplary shared cell heterogeneous deployment incorporating a downlink probed constructed in accordance with the principles of the present invention.

With respect to FIG. 8, an exemplary shared cell heterogeneous deployment incorporating the DL probe message is illustrated. UE 16 is UL hearable at node 12 and RU 14*b* but not UL hearable at RU 14*a* such that UE 16*b* will be included in the list of UEs 16 for which DL hearability will be determined, as discussed above with respect to Block S102. Node 12 causes RU 14*a* to transmit a DL probe message to UE 16*b*, i.e., RU 14*a* receives instructions from node 12 to transmit the probe message to UE 16, such that the test process of false assignment test module 26, true assignment test module 28 or UL grant test module 30 are performed. Node 12 monitors the UL channel associated with UE 16*b*, i.e., monitors UL channel signaling on CPRI line 17*a* for data or signaling associated with UE 16*b*. Alternatively, the probe message may be transmitted from multiple RUs 14 simultaneously and only probe individually selected RU 14 where the multiple RUs 14 test fails. The DL hearability process may be repeated for another RU 14, i.e., RU 14*b*, as discussed in detail with respect to FIG. 2. As such, the DL hearability process provides a probe based technique that uses minimal DL spectral resources and negligible UL spectral resources in which the efficiency of the technique is further improved by only considering UE-RU candidates pairs that have been indicated as being unhearable by UL hearability tests. Furthermore, the DL hearability process is compatible with third generation partnership project Release 8, 9 and 10, i.e., LTE Rel-8/9/10, as the DL hearability process only relies on LTE Rel-8 capabilities, thereby providing an efficient method for confirming DL hearability/non-hearability in a network servicing a UE population made up of release 8 and/or higher.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device for determining whether a radio unit in a shared cell configuration is hearable by user equipment, the device comprising:
a processor, the processor configured to:
cause transmission of a probe message to the user equipment by the radio unit, the probe message including one of a downlink assignment and an uplink grant to invoke a probe response from the user equipment if the radio unit is hearable by the user equipment on a downlink channel, the radio unit being hearable by the user equipment if the downlink channel performance between the radio unit and the user equipment meets a predetermined signal criteria;
monitor an uplink channel associated with the user equipment for the probe response from the user equipment after transmission of the probe message; and
determine hearability data associated with the user equipment based on the monitored uplink channel, the hearability data indicating whether the radio unit is hearable by the user equipment on the downlink channel.

2. The device of claim 1, wherein the downlink assignment is a false downlink assignment configured to cause the user equipment to monitor a downlink channel associated with the false downlink assignment for false test data if the radio unit is hearable by the user equipment on the downlink channel.

3. The device of claim 1, wherein the downlink assignment is associated with downlink shared channel data, the probe message causing the user equipment to enter a hybrid automatic repeat request, HARQ, state if the radio unit is hearable by the user equipment on a downlink channel.

4. The device of claim 1, wherein the hearability data indicates the radio unit is hearable by the user equipment if the received probe response is a hybrid automatic repeat request, HARQ, negative acknowledgement, NACK, message.

5. The device of claim 4, wherein the hearability data indicates the radio unit is unhearable by the user equipment if no probe response is received.

6. The device of claim 4, wherein the probe message causes the user equipment to enter a HARQ state if the radio unit is hearable by the user equipment; and
the processor is further configured to cause transmission of a clean-up message to the user equipment in response to the received HARQ NACK message, the clean-up message causing the user equipment to exit the HARQ state.

7. The device of claim 1, wherein the processor further causes another probe message to be transmitted to the user equipment if a received probe response is a hybrid automatic repeat request, HARQ, acknowledgement, ACK, message, the reception of the HARQ ACK message indicating an error occurred in determining user equipment hearability.

8. The device of claim 1, wherein the user equipment to which the probe message is transmitted is selected, by the processor, from a list of a plurality of user equipments, the plurality of user equipments included in the list being unhearable by the radio unit on an uplink channel.

9. The device of claim 8, the processor is further configured to cause another probe message to be transmitted to another user equipment included in the list of the plurality of user equipments before hearability data is determined.

10. A method for determining whether a radio unit in a shared cell configuration is hearable by a user equipment, the method comprising:
causing transmission of a probe message to the user equipment by the radio unit, the probe message including one of a downlink assignment and an uplink grant to invoke a probe response from the user equipment if the radio unit is hearable by the user equipment on a downlink channel, the radio unit being hearable by the user equipment if the downlink channel performance between the radio unit and the user equipment meets a predetermined signal criteria;
monitoring an uplink channel associated with the user equipment for the probe response from the user equipment after transmission of the probe message; and
determining hearability data associated with the user equipment based on the monitored uplink channel, the hearability data indicating whether the radio unit is hearable by the user equipment the downlink channel.

11. The method of claim 10, wherein the downlink assignment is a false downlink assignment configured to cause the user equipment to monitor a downlink channel associated with the false downlink assignment for false test data if the radio unit is hearable by the user equipment.

12. The method of claim 10, wherein the downlink assignment is associated with downlink shared channel data, the probe message causing the user equipment to enter a hybrid automatic repeat request, HARQ, state if the radio unit is hearable by the user equipment on a downlink channel.

13. The method of claim 10, wherein the hearability data indicates the radio unit is hearable by the user equipment if the received probe response is a hybrid automatic repeat request, HARQ, negative acknowledgement, NACK, message.

14. The method of claim 13, wherein the hearability data indicates the radio unit is unhearable by the user equipment if no probe response is received.

15. The method of claim 13, further comprising causing transmission of a clean-up message to the user equipment in response to the received HARQ NACK message, the clean-up message causing the user equipment to exit a HARQ state.

16. The method of claim 13, further comprising causing another probe message to be transmitted to the user equipment if the received probe message is a HARQ acknowledgement, ACK, message, the reception of the ACK message indicating an error occurred in determining user equipment hearability.

17. The method of claim 10, further comprising implementing at least one of frequency reuse and elimination of at least one downlink transmission based at least in part on the determined hearability data.

18. A method for determining downlink hearability of a plurality of radio units by user equipments in a shared cell heterogeneous deployment, the method comprising:
selecting a radio unit from the plurality of radio units;
generating a list of user equipments that are uplink unhearable by the selected radio unit;
selecting a first user equipment from the list;
determining whether downlink hearability of the first user equipment has been previously determined within a predefined time period;
determining whether a downlink channel has available resources to transmit a probe message to the first user equipment if downlink hearability of the first user equipment has not been previously determined within the predefined time period; and
transmitting the probe message to the first user equipment if the determination is made that downlink channel resources are available, the probe message arranged to invoke a probe response from the first user equipment if the selected radio unit is hearable by the first user equipment on the downlink channel.

19. The method of claim 18, wherein the probe message includes a false downlink assignment configured to cause the first user equipment to monitor a downlink channel associated with the false downlink assignment for false test data if the selected radio unit is hearable by the first user equipment on the downlink channel.

20. The method of claim 19, further comprising:
selecting a second user equipment from the list of user equipments;
determining whether downlink hearability of the second user equipment has been previously determined within a predefined time period;
determine whether the downlink channel has available resources to transmit a second probe message to the second user equipment if downlink hearability of the second user equipment has not been previously determined within the predefined time period; and
transmitting the second probe message to the second user equipment if the determination is made that downlink channel resources are available, the second probe message arranged to invoke a probe response from the second user equipment if the selected radio unit is hearable by the second user equipment on the downlink channel.

21. The method of claim 20, further comprising:
selecting a second radio unit from the plurality of radio units;
generating a list of user equipments that are uplink unhearable by the second radio unit;
selecting a third user equipment from the list associated with second radio unit;

determining whether the downlink channel has available resources to transmit a third probe message to the third user equipment;

transmitting the third probe message to the third user equipment if the determination is made that downlink channel resources are available, the third probe message arranged to invoke a probe response from the third user equipment if the second radio unit is hearable by the third user equipment on the downlink channel.

* * * * *